United States Patent
Zeh et al.

(10) Patent No.: US 11,321,442 B2
(45) Date of Patent: May 3, 2022

(54) DATA LINK LAYER AUTHENTICITY AND SECURITY FOR AUTOMOTIVE COMMUNICATION SYSTEM

(71) Applicant: Infineon Technologies AG, Neubiberg (DE)

(72) Inventors: Alexander Zeh, Munich (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 110 days.

(21) Appl. No.: 16/825,896

(22) Filed: Mar. 20, 2020

(65) Prior Publication Data

US 2021/0294889 A1    Sep. 23, 2021

(51) Int. Cl.
| | | |
|---|---|---|
| *G06F 21/44* | (2013.01) | |
| *G06F 21/60* | (2013.01) | |
| *H04L 9/14* | (2006.01) | |

(52) U.S. Cl.
CPC ............ *G06F 21/44* (2013.01); *G06F 21/602* (2013.01); *H04L 9/14* (2013.01)

(58) Field of Classification Search
CPC ........... G06F 21/44; G06F 21/602; H04L 9/14
See application file for complete search history.

(56) References Cited

U.S. PATENT DOCUMENTS

| 2008/0075073 A1* | 3/2008 | Swartz | .................. H04L 63/162 370/389 |
| 2016/0174022 A1 | 6/2016 | Nhu | |
| 2018/0076970 A1* | 3/2018 | Han | ........................ H04L 12/46 |

FOREIGN PATENT DOCUMENTS

CN        106899404 A      6/2017

OTHER PUBLICATIONS

Partial International Search Report for Application No. PCT/EP2021/057087, dated Jun. 1, 2021, 8 pages.
International Search Report and Written Opinion for Application No. PCT/EP2021/057087, dated Aug. 4, 2021, 20 pages.
Megha et al., "CAN-FD-Sec: Improving Security of CAN-FD Protocol," Advances in Databases and Information Systems, [lecture Notes in Computer Science; Lect.notes Computer], Springer International Publishing], Mar. 2019, pp. 77-93.
Pradeep Y.B., "Can-FD and Ethernet Create Fast Reliable Automotive Data Buses for the Next Decade", Automotive Compilation, Apr. 2013, vol. 10, pp. 36-43. URL:http://www.atmel.com/ja/jp/Images/Article AC10 CAN-FD-and-Ethernet.pdf.

* cited by examiner

*Primary Examiner* — Abiy Getachew
(74) *Attorney, Agent, or Firm* — Harrity & Harrity LLP

(57) ABSTRACT

The present disclosure relates to authenticity and data security for bus-based communication networks in a vehicle. The present disclosure teaches a protocol frame, a sender on data link layer, and a receiver on data link layer providing such authenticity and data security as well as a communication network in a vehicle employing the protocol frame, the sender and the receiver according to the present disclosure.

20 Claims, 6 Drawing Sheets orginal frame authenticated frame authenticated + encrypted frame authentication only @ receiver authentication & encryption @ sender S authenticated & decryption @ receiver R

DATA LINK LAYER AUTHENTICITY AND SECURITY FOR AUTOMOTIVE COMMUNICATION SYSTEM

FIELD

The present disclosure relates Authentication and Security on data link layer for networks in vehicular networks.

BACKGROUND

In today's vehicles data integrity and security become a necessity. In the past several functions, such as steering where provided by a physical connection from the steering wheel to the wheels of a vehicle. The same holds for braking and gear shifting functions. In today's vehicles however, there is no longer such physical connection but an electrical wire or bus communicating the steering command to the electric power steering. In response to the steering command over the bus, the electric power steering will actuate a turn of the wheels corresponding to the turn of the steering wheel.

Having access to the bus may allow for insertion of malicious bus communication or commands in an attempt to take over functions of a vehicle. The risk of inserted malicious bus commands is further increased with the growing entertainment functionality or connectivity provided with today's vehicles.

For autonomous driving vehicles or cars the risk is even higher, as sensor data to analyze a surrounding of the car, as well as commands to actuators controlling the vehicle may be realized as bus communication.

One way to mitigate this risk is to provide authenticity and security for such bus communication on a data link layer level, without burdening higher protocol layers with these authenticity and/or security issues.

SUMMARY

According to some possible implementations, a protocol frame, for communication between participants of a bus-based communication system in a vehicle according to a protocol, may include a header, indicating a start of the protocol frame to be communicated between a sender and a receiver, both the sender and the receiver being participants of the bus-based communication system, and an indication, the indication configured to indicate a level of authenticity and/or data security of the protocol frame on the data link layer. In a first implementation, the indication comprises a first indication configured to indicate authentication on a data link layer level for the protocol frame.

In a second implementation, alone or in combination with the first implementation, the indication comprises a second indication configured to indicate authentication and data security, both on a data link layer level for the protocol frame.

In a third implementation, alone or in combination with one or more of the first and second implementations, at least one of the indication, the first indication, or the second indication is part of the header of the protocol frame.

In a fourth implementation, alone or in combination with one or more of the first through third implementations, at least one of the indication, the first indication, or the second indication is represented as a payload type of the protocol frame.

In a fifth implementation, alone or in combination with one or more of the first through fourth implementations, at least one of the indication, the first indication, or the second indication is represented as a security indication flag or a bit field within the header.

In a sixth implementation, alone or in combination with one or more of the first through fifth implementations, the protocol frame may include security information downstream from the header; and a protected payload portion downstream from the header, wherein the security information indicates a protection level for the protected payload portion.

In a seventh implementation, alone or in combination with one or more of the first through sixth implementations, the security information is further configured to indicate at least one of: a virtual channel between the sender and the receiver, or one or more keys.

In an eighth implementation, alone or in combination with one or more of the first through seventh implementations, the indication in combination with the security information indicates whether authentication only or authentication and data protection applies to the protocol frame.

In a ninth implementation, alone or in combination with one or more of the first through eighth implementations, the security information is further configured to indicate a security association indicating a key to be selected for authentication or authentication and data security for the protocol frame on a data link layer level.

In a tenth eighth implementation, alone or in combination with one or more of the first through ninth implementations, the protocol frame further comprises: a security tag configured to verify authenticity of the protocol frame on a data link layer level as original protocol frame intended for transmission from a sender to a receiver, wherein the security tag is configured to verify the authenticity of the protocol frame at the sender on the data link layer or on the receiver on the data link layer.

In an eleventh implementation, alone or in combination with one or more of the first through tenth implementations, the frame has a length N as used with a controller area network (CAN) standard, a CAN flexible data-rate standard, or a CAN extra-large standard.

In a twelfth eighth implementation, alone or in combination with one or more of the first through eleventh implementations, the frame selectively has a length N of eight bytes, eight to 64 bytes, or 64 to 2048 bytes.

According to some possible implementations, a sender on a data link layer configured to participate in a bus-based communication system in a vehicle, the sender configured to: generate a header in response to a request from a higher protocol layer; access a key K of k bytes length, receive from a higher protocol layer a protected payload portion, aggregate additional authentication data; generate a security tag using the key K and the additional authentication data, the security tag to verify an authenticity of a frame as original frame sent from the sender to a receiver on a data link layer level; and generate a protocol frame comprising the header, the protected payload portion, and the additional authentication data, wherein the sender is configured to communicate the protocol frame from the sender to one or more participants of the bus-based communication system on the data link layer level.

In a first implementation, the bus-based communication system is a broadcast based bus system such that all nodes within the bus-based communication system are configured to receive the protocol frame communicated by the sender.

In a second implementation, alone or in combination with the first implementation, the protocol frame further comprises an indication, the indication configured to indicate a level of authenticity or a level of data security of the protocol frame on the data link layer.

In a third implementation, alone or in combination with one or more of the first and second implementations, the indication comprises a first indication configured to indicate authentication on the data link layer level for the protocol frame.

In a fourth implementation, alone or in combination with one or more of the first through third implementations, the indication comprises a second indication configured to indicate authentication and data security, both on the data link layer level for the protocol frame.

In a fifth implementation, alone or in combination with one or more of the first through fourth implementations, at least one of the indication, the first indication, or the second indication is part of the header of the protocol frame.

In a sixth implementation, alone or in combination with one or more of the first through fifth implementations, at least one of the indication, the first indication, or the second indication is represented as a security indication flag or a bit field within the header.

In a seventh implementation, alone or in combination with one or more of the first through sixth implementations, in an authentication only mode of the sender, the additional authentication data is: the header, and the protected payload portion.

In an eighth implementation, alone or in combination with one or more of the first through seventh implementations, the sender in an authenticated encryption mode is further configured to: generate a cipher text for the protected payload portion using: the key, the protected payload portion in plain text; and the header, as additional authentication data.

In a ninth implementation, alone or in combination with one or more of the first through eighth implementations, the sender is further configured to: generate a sequence number of sn bytes downstream from the header and configured to integrate the sequence number into the protocol frame at an expense of a shortened protected payload, the shortened protected payload being shortened by sn bytes compared to the protected payload portion.

In a tenth eighth implementation, alone or in combination with one or more of the first through ninth implementations, in the authentication only mode of the sender, the additional authentication data comprises: the header, the sequence number, and the protected payload.

In an eleventh implementation, alone or in combination with one or more of the first through tenth implementations, the sender is configured to generate security information of length si, using the key K; and further configured to integrate the security information into the protocol frame downstream from the header at an expense of a shortened payload, the shortened payload being shortened by si bytes compared to the protected payload, wherein the security information indicates a protection level for the protected payload portion.

In a twelfth implementation, alone or in combination with one or more of the first through eleventh implementations, the sender in an authenticated encryption mode is further configured to generate security information of si bytes length, and further configured to integrate the security information into the protocol frame downstream from the header to an expense of a shortened protected payload, the shortened protected payload being shortened by si+sn bytes compared to the protected payload, wherein the security information indicates a protection level for the shortened protected payload.

In a thirteenth implementation, alone or in combination with one or more of the first through twelfth implementations, the additional authentication data comprises: the header, a sequence number as nonce, the security information; and the shortened protected payload.

In a fourteenth implementation, alone or in combination with one or more of the first through thirteenth implementations, the sender in the authenticated encryption mode is further configured to: generate a cipher text using: the key, a sequence number as nonce, the protected payload in plain text; and the header, a serial number, and the security information, as additional authentication data.

In a fifteenth implementation, alone or in combination with one or more of the first through fourteenth implementations, the sender is configured to select the key K from a plurality of keys according to a security association, wherein the security association is represented within the security information of the protocol frame.

According to some possible implementations, a receiver on a data link layer to participate in a bus-based communication system in a vehicle, the receiver configured to: receive, on the data link layer and from a sender, a protocol frame according to a protocol; and extract an indication from the protocol frame, the indication configured to indicate a level of authenticity or a level of data security of the protocol frame on the data link layer.

In a first implementation, the receiver is further configured to: extract a header from the protocol frame, extract a protected payload portion from the protocol frame, access a key of k bytes length, extract a security tag from the protocol frame downstream from the header, and calculate an authenticity indication, based on: the key, additional authenticity data comprising the header, the security tag, and the protected payload, wherein the authenticity indication is configured to verify on the data link layer an authenticity of the protocol frame sent from the sender to the receiver.

In a second implementation, alone or in combination with the first implementation, the receiver is further configured to drop the protocol frame, if the authenticity indication does not verify an authenticity of the protocol frame sent from the sender to the receiver, and optionally configured to indicate such lack of authenticity to a higher protocol layer.

In a third implementation, alone or in combination with one or more of the first and second implementations, the bus-based communication system is a broadcast based bus system, such that all nodes within the bus-based communication system are configured to receive the protocol frame communicated by the sender.

In a fourth implementation, alone or in combination with one or more of the first through third implementations, the indication comprises a first indication configured to indicate authentication on a data link layer level for the protocol frame.

In a fifth implementation, alone or in combination with one or more of the first through fourth implementations, the indication comprises a second indication configured to indicate authentication and data security, both on a data link layer level for the protocol frame.

In a sixth implementation, alone or in combination with one or more of the first through fifth implementations, at least one of the indication, the first indication, or the second indication is part of a header of the protocol frame.

In a seventh implementation, alone or in combination with one or more of the first through sixth implementations, at least one of the indication, the first indication, or the second indication is represented as a security indication flag or a bit field within a header.

In an eighth implementation, alone or in combination with one or more of the first through seventh implementations, in an authenticated decryption mode of the receiver, the receiver is configured to generate a decrypted payload as output stream to a higher protocol layer using: a key, a protected payload portion as cipher text, and additional authentication data, if an authenticity indication indicates authenticity of the protocol frame sent from the sender to the receiver.

In a ninth implementation, alone or in combination with one or more of the first through eighth implementations, additional authentication data comprises a header.

In a tenth eighth implementation, alone or in combination with one or more of the first through ninth implementations, the receiver is further configured to extract a sequence number of sn bytes from the protocol frame.

In an eleventh implementation, alone or in combination with one or more of the first through tenth implementations, additional authentication data comprises a header, and the sequence number.

In a twelfth implementation, alone or in combination with one or more of the first through eleventh implementations, in an authenticated decryption mode of the receiver, the receiver is configured to: generate a decrypted payload as output stream to a higher protocol layer using the sequence number, a key, a protected payload portion as cipher text, and additional authentication data, if an authenticity indication verifies authenticity of the protocol frame sent from the sender to the receiver, and the receiver configured to signal the authenticity indication to a higher protocol layer.

In a thirteenth implementation, alone or in combination with one or more of the first through twelfth implementations, the additional authentication data comprises a header, the sequence number, and security information.

In a fourteenth implementation, alone or in combination with one or more of the first through thirteenth implementations, the receiver is further configured to extract security information downstream from a header from the protocol frame; wherein the security information indicates at least one of a virtual channel between the sender and the receiver; and a key to be selected according to a security association for protection of a protected payload portion.

In a fifteenth implementation, alone or in combination with one or more of the first through fourteenth implementations, in an authentication and decryption mode of the receiver, the receiver is configured to generate a decrypted payload as output stream to a higher protocol layer using the key, a sequence number, a protected payload portion as cipher text, and additional authentication data, if an authenticity indication verifies authenticity of the protocol frame sent from the sender to the receiver; and the receiver configured to signal the authenticity indication to a higher protocol layer.

According to some possible implementations, a communication network in a vehicle configured to provide communication on transport level layer between a sender as described herein and a receiver as described herein using protocol frames as described herein

BRIEF DESCRIPTION OF THE DRAWINGS

Implementations are described herein making reference to the appended drawings.

DETAILED DESCRIPTION

Figure 1A:
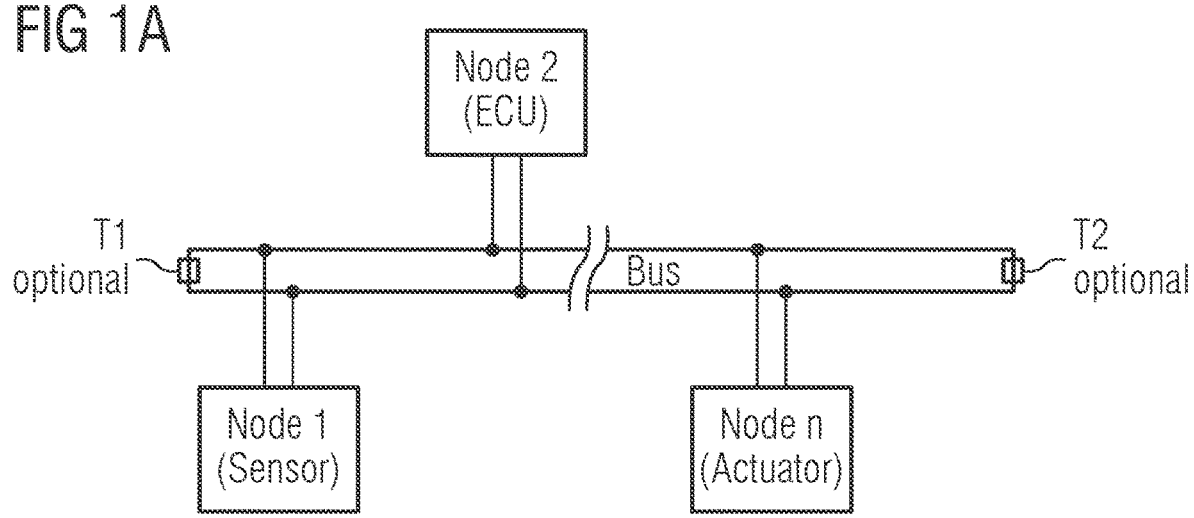
FIG. 1A shows a block diagram illustrating a bus-based communication system in a vehicle.

FIG. 1A illustrated an example bus connecting several nodes Node1, Node2, . . . , Node n. In the example of FIG. 1A, the bus is depicted as a two line bus system, which may conveniently be implemented as two differential lines. Obviously, other setups are conceivable, too. The bus system may be terminated with optional termination resistors T1, T2 which may be of interest to reduce reflections on the bus typically affecting signal quality along the bus. Prominent examples of bus systems in a vehicle are CAN, CAN-FD, CANXL, or LIN networks. While the present disclosure focuses on CAN variants, it will be apparent to a person skilled in the art that teachings of this disclosure may be applied to other bus systems as well.

It will be appreciated that the bus depicted in FIG. 1A may also be arranged in a ring-type topology where both ends of the bus are fed into a master unit (not shown) thereby forming a bus loop. The individual nodes Node 1, 2, . . . , n will as before be coupled to the bus.

It is to be understood that in vehicle networks or bus-based communication systems (as depicted in FIG. 1A) have specific attributes reflecting requirements for in vehicle networks. The in vehicle network supports communication of sensor data to a control unit by data frames being transmitted from the sensor or a control unit of the sensor to a control unit on a higher level. A useful protocol may be used for the data frames or protocol frames communicated between individual nodes or participants of the bus-based communication network.

In return or in response to receipt of sensor data, the control unit of the sensor or the control unit on the higher level, may communicate a certain action to an actuator coupled to the bus, say a braking action to a brake actuator. So in the example of FIG. 1A Node 1 could represent an angle sensor (not shown) measuring an angle of how far a brake paddle is pressed. This angle may be transmitted as protocol frame(s) to the ECU of a higher level, say Node 2. In response to receiving the angle value, the ECU may send one or more bus frames to Node N, the brake actuator. These bus frames sent from the ECU to the brake actuator may cause a braking action.

It will be apparent that bus communication related to the braking action is time critical and needs to be transmitted fast. Such real-time requirements are not common in standard communication networks.

In vehicle communication networks typically have a well-defined number of bus participants that by default stays constant over the lifetime of a vehicle; ignoring some upgrades of the vehicle for a moment. Likewise, existing links between individual nodes, hence a topology of the bus-based communication system will not be altered over the lifetime of the vehicle. For a standard computer network, such a situation is very unlikely. In fact, it is for standard computer networks required to allow addition or removal of nodes during operation of the computer network. Further, new links may be provided, or links removed during operation in standard computer networks.

In a bus-based communication system controlling vehicle function, it is of interest to assure authenticity of a protocol frame transmitted over the bus. Considering a braking action, a command causing an emergency braking should not be mistaken for a gentle braking when parking the vehicle in a controlled manner. To this end an indication of authenticity of a protocol frame communicated between participants of the bus-based communication system is of interest.

It will be appreciated, that indicating authenticity of a protocol frame on data link layer is of interest in order to reduce involvement of higher protocol layers in authentication of time-critical commands communicated between participants of the bus-based communication system.

With increasing entertainment systems as well as increasing vehicle to vehicle communication becoming available today, there is an increasing susceptibility to malicious commands or protocol frames being injected to the communication system.

It is therefore of interest to provide data security for protocol frames in order to prevent injection of the malicious protocol frames. As for authenticity indication of protocol frames, it is attractive to provide the data security at data link layer level, too. This way, involvement of higher protocol layers or software stacks on higher protocol layers providing security and/or authenticity information becomes unnecessary. It will be apparent to a person skilled in the art, that data security and authenticity functions may conveniently be supported by hardware elements such as a sender or a receiver on protocol layer. In other words, data security and authenticity functions may be off-loaded to dedicated hardware on the data link layer level when implementing these functionalities on the data link layer level.

Figure 1B:
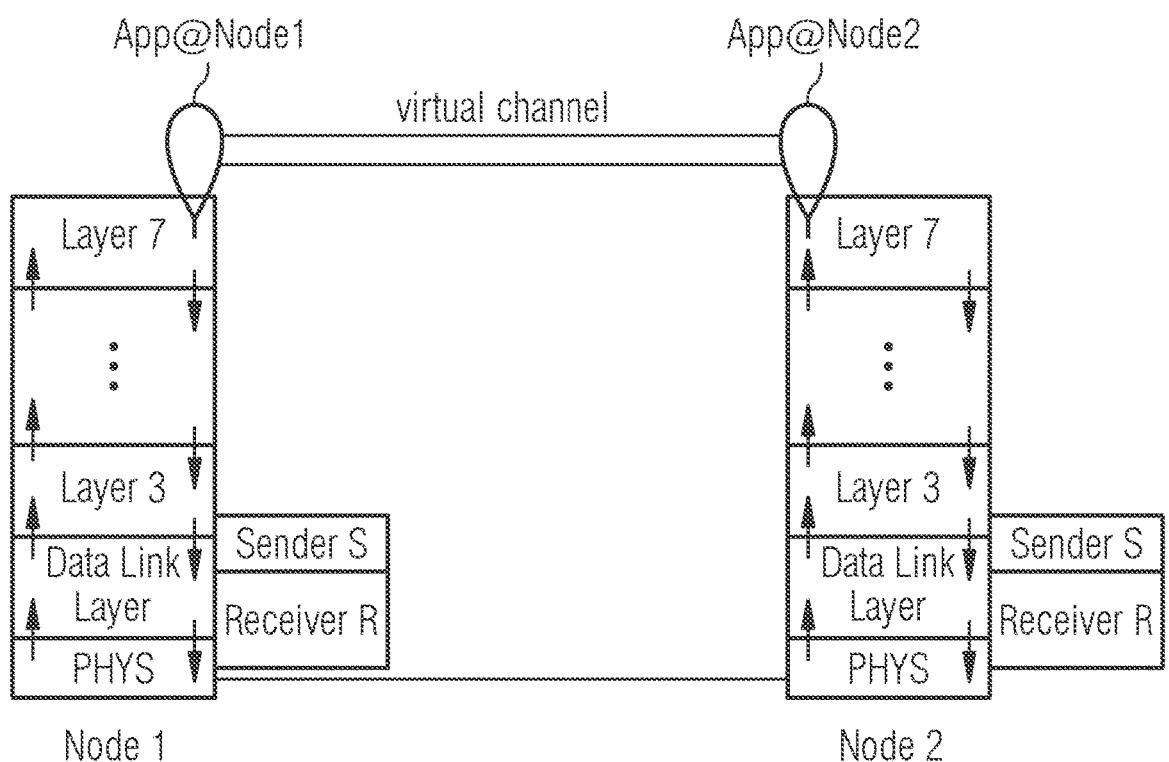
FIG. 1B shows a diagram illustrating communication stack and virtual channels between a sender and a receiver on data link layer according to the present disclosure.

FIG. 1B illustrates Node 1 and Node 2 as participants of a bus-based communication system as illustrated in FIG. 1A. Communication between Node 1 and Node 2 flows in different layers that can be categorized according to the well established OSI-ISO layer model. The lowest level layer is the so called physical layer, indicated as PHYS for Node 1 and Node 2. Each layer in the OSI model accepts an order from a higher level, performs some action at its level, and may trigger tasks in a lower lying level by forwarding a request to the lower lying level.

A command to the physical layer may be received from the data link layer, as indicated by the downward arrow between the PHYS layer and the data link layer. As layer function, the physical layer of Node 1 may use a connection or link to Node 2 in order to communicate data on the physical layer to the Node 2. Under the same token Node 1 may receive data from Node 2 over the physical link between Node 1 and Node 2, and further forward the received data to the data link layer on top of the physical layer. This forwarding is indicated by the upward arrow between the physical layer and the data link layer of Node 1 in FIG. 1B. The protocol flow in Node 2 is analog to the one explained for Node 1.

Some of existing bus-based communication networks in vehicles do not follow the separation of physical layer and data link layer as suggested in the OSI-ISO model. To reflect this specialty sender S and receiver R are depicted in FIG. 1B as extending over the physical layer PHYS and the Data Link Layer.

Known concepts for authenticity of data communication in vehicles are implemented in the application layer on layer 7 of the OSI-ISO layer model using a software stack, indicated as App1, App2 for Node 1 and Node 2, respectively in FIG. 1B. It may be convenient to introduce a concept of virtual channels between Node 1 and Node 2 in order to indicate an authenticated and/or protected communication between two or more participants using the software stacks App @Node1 and App@Node2.

An example to provide security for onboard networks in a vehicle using software stacks is SEC OC (Secure OnBoard Communication) according to the AUTOSAR standard. It may be convenient for OEMs to specify the software stacks App for Node 1 and Node 2, giving freedom in hardware implementation of Node 1 and Node 2. As a trade-off implementing authenticity and/or data security using a software stack may no longer meet real-time requirements for an actuator response to a command from the electronic control unit (ECU) to the actuator depicted as Node n in FIG. 1A participating in the bus-based communication system. Consider for example a braking command sent as a protocol frame 100 (best seen in FIGS. 2A-2C, or FIG. 4) from the control unit ECU—depicted as Node 2 in FIG. 1A—to the braking actuator, say Node n in FIG. 1A. If such communication was to be authenticated and secured, using the software stack, all layers for an individual Node will be involved in this securing which may take too long for a reliable braking operation.

A further disadvantage of a software stack authenticity and/or data security solution may be the fact that the software stacks maybe not be properly designed, so that the authenticity and/or security functionality is degraded or even compromised.

Therefore it is, depending on circumstances attractive, to limit functionality pertaining to authenticity and/or data security to a single layer of an individual participant to the communication system, such as Node 1 or Node 2 in FIG. 1B. Limiting the authenticity and/or data security functionality to the data link layer, will prevent the other protocol layers to be occupied with parts of the data integrity and/or data security operations.

As a further benefit, protocol frames 100 for which no authenticity may be established, may be dropped on the data link layer, already. This is to say, if an authenticity test shows that the protocol frame 100 was not intended to be sent from the sender to the receiver and/or did not arrive at the receiver in its original form, the protocol frame 100 may be dropped without further processing. So an attempt of flooding one participant of the bus-based communication system with invalid or non-authenticated frames 100 on the data link layer shall only affect this one Node on the data link layer, while the higher protocol layers may remain unaffected. For a software stack based approach to authenticity and/or data security, such confinement of authenticity and/or data security efforts would not be possible.

Further, it is convenient to use dedicated hardware elements, namely a sender on data link layer and/or a receiver on the data link layer implementing the authenticity and/or data security as a piece of dedicated hardware. This would have a further advantage, such a building block—think of a CAN bus transceiver—can be used as a standard circuit without further research or adaptation needed should bus participants or software applications App at the participant change over time.

In the following examples of protocol frames 100 implementing different levels of authentication and/or data security on data link layer shall be discussed with regards to FIGS. 2A-2C.

Figure 2A:
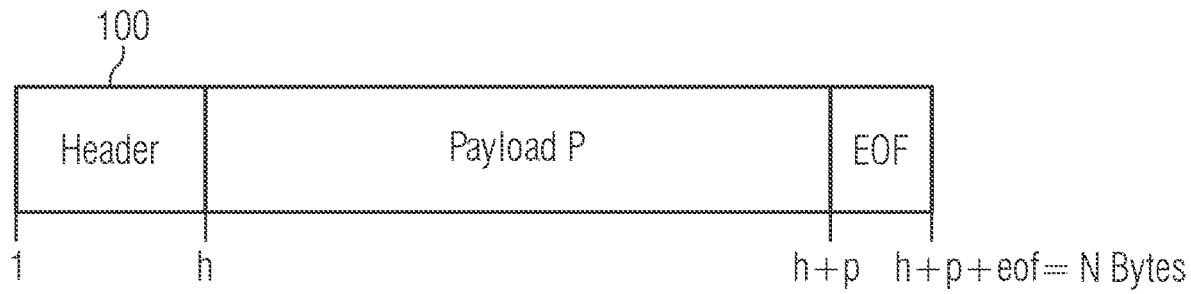
FIG. 2A shows an example of a protocol frame according to a known protocol used in a vehicle.

FIG. 2A shows an original protocol frame 100 with a total length of N bytes, N being an integer number. The protocol frame 100 may comprises a Header H, a payload P, and an end of frame indication EOF. The header H may have a length of h bytes, h being an integer smaller than N. The payload P may have a length of p bytes. The end of frame indication EOF may have a length of eof bytes.

In FIG. 2A the payload P is depicted downstream the header H, and the end of frame portion EOF downstream the header H, and downstream the payload P. It will be appreciated that the length of the header H, the payload P, the end of frame indication add up to the total length of N bytes of the protocol frame 100. It will be further understood that the respective length of individual elements Header H, payload P, or EOF may be of a bit length not commensurable to a full byte length. In such a case the total length of the protocol frame may remain N bytes but individual segments of the protocol frame 100 may have a length on sub-byte level. It may further be noted, that according to a protocol the total length of the protocol frame 100 may be a number of bits that is not commensurable with a byte length.

The header H may be used to indicate a start of the protocol frame 100, the length N of the frame, the protocol or protocol variant according to which it is compliant.

It is possible to indicate rights or priorities associated with the protocol frame 100 in the header H. Such options are typically indicated in the protocol specification.

The protocol specification could further provide a first indication within frame indicating that authentication on data link layer level is provided for a given protocol frame. Alternatively, the protocol specification may provide a second indication within the frame that authentication and data security, both on data link layer level are provided for a given protocol frame. Depending on circumstances, it may be convenient to provide a generic indication within the protocol header H to indicate that authentication or authentication and data security, both on data link layer level, are provided for a given frame. The generic indication for both variants may be convenient to facilitate processing of the header H, as fewer indications are required within the header H. As a consequence of using the generic indication within the header H, some further space may be required within the frame 100 to indicate the full level of authentication and data protection on the data link layer for the frame 100 as a tradeoff for the simplified processing of header H.

Payload type pt indications within the header H are known for in vehicle networks. Payload type indications may be convenient in order to indicate what type of payload is being transported within the frame. In the in vehicle network, frames supporting various payload types pt, say an Ethernet frame, an original CAN frame, or a braking command, to a brake actuator, could be indicated using payload type portion pt of the header H. Obviously, such a structure would facilitate processing of frames of different types as it becomes apparent early on what type of payload is being conveyed in this frame, when processing a frame on data link layer level.

It may be convenient to implement the first indication, the second indication, or the generic indication with regards to authentication and encryption on data link level layer as a dedicated payload type pt. This way the known concept of payload types would be extended to further indicate a level of authentication and/or data security provided for a given frame. If one decides to implement the generic indication using a dedicated payload type pt, as mentioned before, processing of header H is simplified at the tradeoff of some further space within the frame being required to indicate the full level of authentication and data protection on the data link layer for the frame 100.

It will be appreciated that such indication of authenticity, or authenticity and data security can be implemented without involving higher protocol layers as would be the case for software stacks providing authenticity or authenticity and data security for a given frame.

As a further alternative the protocol specification may introduce a security indication that will be added as a new data field within the protocol frame 100, most conveniently within the header H. As mentioned before, including the security indication in the header H will reduce the effort of frame processing required, before it becomes apparent what level of authenticity and/or security was applied to a given frame 100. Depending on circumstances the protocol may provide the security indication carrying the meaning of the generic indication which would reduce space required for the security indication. For this scenario a single bit field within the frame 100, most conveniently within the header H would be sufficient to carry the information of the generic indication in the dedicated security indication added as data field to the header H. As a tradeoff there will be further information required to get the full information regarding what level of authenticity and data security applies to the given frame, as already discussed with regards to the generic indication.

In FIG. 2A the payload P is depicted downstream the header H, and the end of frame portion EOF is downstream the header H, and downstream the payload P. This convention for a downstream relation will be used throughout this disclosure.

It is further conceivable that the protocol permits for the protocol frame 100 to be of varying frame length N. The overall frame length N could for example vary depending on the amount of information conveyed with an individual instance of the protocol frame 100.

In a vehicular environment, a concurrent operation of older and recent devices according to different protocol variants is likely. As an example, rather old devices, say an ABS sensor may be communicating according to an early variant of the protocol, say for example CAN protocol (CAN being short for Controller Area Network), while more recent devices, such as a LIDAR system may communicate with an electronic control unit using the CAN-FD (CAN-FD being short Controller Area Network flexible-data rate) standard or even using to the CANXL standard. It may therefore be useful to indicate the different protocol types in the header H, as this would also affect the level of authenticity and/or data protection that applied to an individual protocol frame 100. In a similar manner, it may be convenient to indicate an authenticity and/or data security level both on data link layer level for a given frame using a payload type indication. To this end the first indication, the second indication, the generic indication, and the security indication may be used.

Under such circumstances it may be of interest to have the total frame length of N bytes or bits stored or coded somewhere in the protocol frame 100. Setting a frame length flag would be one option how the frame length could be coded. How such information could be stored in the protocol frame 100 may be taken from the protocol specification.

The end of frame indication eof may further comprise error check information, as known in the art and is therefore not explained any further at this point.

Figure 2B:
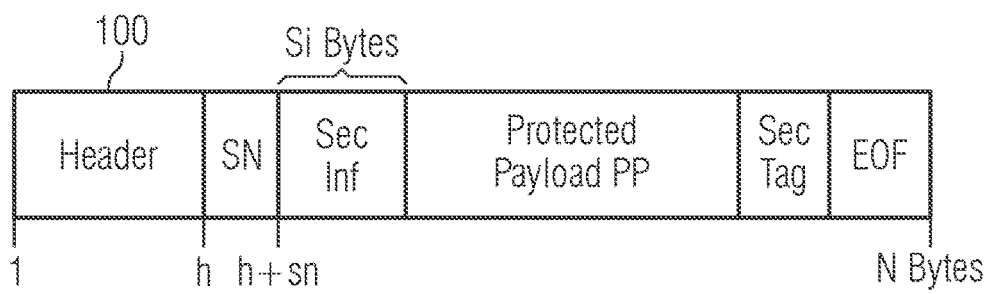
FIG. 2B shows an example of a protocol frame, providing authentication of such protocol frame on data link layer level.

FIG. 2B shows an example of a protocol frame according to the present disclosure. The protocol frame 100 may comprise a header H like the original protocol frame of FIG. 2A. It is convenient to have the Header H including the first indication, the second indication, the generic indication, or the security indication with regards to authenticity and/or data security on data link layer level. Alternatively the header H may include the payload type pt also covering authenticity and/or data security aspects as discussed above.

The protocol frame 100 of FIG. 2B has a length of N bytes or N bits as described above. Different to the standard protocol frame, the frame of FIG. 2B comprises a protected payload portion PP. The protected payload portion PP is shortened in order to make room for a security tag SecTag which may have a length of st bytes. The protocol frame 100 according to the present disclosure may optionally comprise a security info SecInf of si bytes, with si being an integer number. Without limitation the security info SecInf may be implemented as part of the header H. The protocol frame according to FIG. 2B may optionally further comprise a sequence number SN of length sn. Depending on circumstances it may be convenient to arrange the sequence number SN in the header H. For such an arrangement a frame containing an incorrect sequence number SN may be dropped earlier than with sequence number SN being arranged downstream the header H. Without limitation the length st, si, sn, or pp may or may not be commensurate with a full byte length as described before with regards to FIG. 2A.

As an alternative it may be of interest to transmit a shortened version of the sequence number SN.

A person skilled in the art will also appreciate the option to not transmit any sequence number in the frame 100. If one chose this route it is required that both, sender and receiver are aware of a common starting value for the sequence number and then count individually according to a predefined counting scheme. This sequence number may typically be related to a security association.

The security info SecInf may indicate a level of authentication on data link layer level for a given frame. Alternatively, the security info SecInf may indicate a level of authentication and data security on the data link layer level for a given frame.

It is further possible to use the generic indication of authentication or encryption on data link layer level within the header H in combination with a simplified security info SecInfo. The same holds true for the security indication. Such simplified security info SecInf is to indicate whether a given frame is authenticated only or authenticated and encrypted, while the generic indication within the header would indicate that some level of authenticity or data security, hence encryption, is present for the given frame, as discussed above.

It will be appreciated, that for a frame 100 where there is neither authentication nor data security provided, the security information SecInfo or the simplified security info may be set to a selected value indicating that no authentication and no data security is provided for a given frame. Alternatively, the protocol specification may allow for the security info SecInfo or the simplified security info to be omitted when the generic indication or the security indication in the header already indicate that there is no authentication or data security for a given frame.

The security Tag SecTag may represent an authentication indication that the protocol frame 100 was intended to be transmitted from a sender S to a receiver R on the data link layer level. The security tag SecTag further allows to check whether or not the protocol frame 100 was altered on its way to the receiver R.

While the security tag SecTag is depicted downstream the protected payload portion PP, it may as well be arranged upstream of the protected payload portion PP or even integrated into the standard header H, without limitation.

It will be appreciated that a secret key K is required for authentication, encryption and decryption. Key deployment is not at the heart of the present disclosure for several reasons:

Firstly, in an automotive environment the number of participants in a bus-based communication system is limited and does not change much over lifetime of the vehicle. It may be convenient to use one key K of length k for all participants on the bus communication system.

If individual nodes communicatively coupled via the bus communication system should use an individual key K, this individual key could be stored in respective nodes of the bus-based communication system during production of the vehicle. So there could be a first key K1 for communication between Node 1 and Node 2, stored at Node 1 and Node 2, and a second key K2 for communication between Node 1 and Node 3, stored at Node 1 and Node 3, respectively, and so forth. It is assumed that sender S and receiver R use the same key K, hence decryption, encryption, authentication, and verification to be symmetric.

If more than one key K is used within the system, it may be of interest to store information regarding the key(s) K involved in authentication and/or data security may be stored or indicated in the optional security info field SecInf. It is a further option to indicate using the security info field whether or not the present protocol frame 100 is an authenticated only protocol frame or an authenticated and encrypted protocol frame 100. Obviously, the information on which key to be used, may also be represented using other data fields within the frame for example a virtual CAN ID, a payload type pt, or an acceptance field.

Considering a rather long life span of a vehicle one may want to have more than one key K protecting or authenticating and protecting communication between selected nodes within the network. More precisely, one would like to change keys during the life of the vehicle. It may be convenient to introduce two or more keys at communicating nodes so that nodes can change keys used for authentication and data security. Such change of keys for authentication and/or encryption requires some information on which key is currently being used. We would like to term such information on the currently employed key as security association. The security association may be conveniently stored within the header H, the security info SecInfo, or the simplified security info. The protocol specification may allow for the security association to be set to a special value for a frame without authentication or data protection, both on data link layer level. Alternatively, the protocol specification may allow for the security association to be omitted under such circumstances.

The field sequential number SN is a further optional element in the protocol frame 100. The sequence number SN is a once used integer number, also referred to as Nonce. If the sequence number SN changes in a way that is unknown to a listening party, it helps prevent replay attacks to be successful. The AUTOSAR standard suggested a similar concept with its freshness value in order to prevent replay attacks.

It will be appreciated that some of the SADSE algorithms explained below may require a nonce of a certain length. Therefore it may be of interest to derive the nonce N from the sequence number SN, depending on circumstances.

As simplest implementation of authentication and/or data security on the data link layer, one may implement a scheme with authentication only, with a frame including the sequence number SN, if a replay protection is required. If such protection is not required the sequence number SN may be omitted allowing for a larger protected payload portion PP within the protocol frame. 100.

Depending on circumstances one may decide that there will only be one key K within the system used for authentication, than the field security information comprising such information on different keys K1, K2, K3 . . . to be used, may be omitted, allowing for a larger protected payload portion PP.

Should neither different keys K1, K2, K3 . . . nor a replay protection be required, the fields sequence number SN as well as the security info SecInf may be omitted, allowing for a further increased protected payload portion PP in comparison to the protocol frame depicted in FIG. 2A with only the security Tag SecTag reducing the protected payload field PP compared to a standard protocol frame.

Figure 2C:
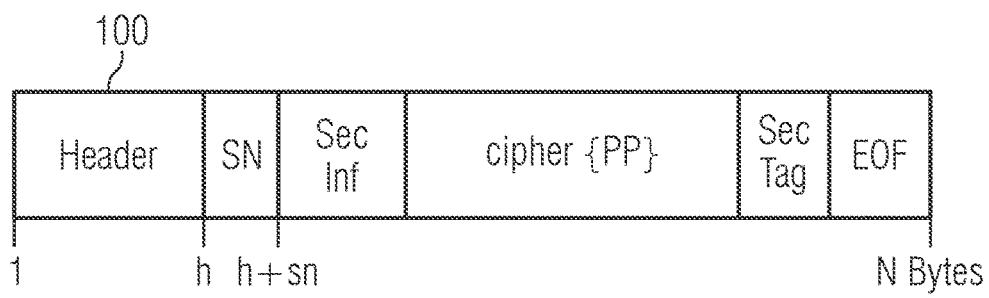
FIG. 2C shows an example of a protocol frame, providing authenticated encryption of such protocol on data link layer level.

FIG. 2C illustrates an authenticated and encrypted protocol frame 100 according to the present disclosure. The protocol frame 100 of FIG. 2C comprises a header H, an end of frame indication EOF, the security tag SecTag, the optional field sequence number SN, the optional security info SecInf as discussed with regards to FIG. 2B. The protocol frame of FIG. 2C is of the same length as the protocol frames in FIGS. 2A, and 2B. As before, individual frame elements Header H, optional sequence number SN, as well as the total frame length N may be any integer number of bytes or any other length not commensurable to a full byte length.

The protocol frame 100 of FIG. 2C comprises a cipher text cipher {PP} of the protected payload PP instead of the protected payload PP. The protocol frame of FIG. 2C is of the same length as the protocol frames in FIGS. 2A, and 2B. As before, individual frame elements Header H, optional sequence number SN, as well as the total frame length N may be any integer number of bytes or any other length not commensurable to a full byte length.

One convenient way of implementing authenticity and/or data security protection for protocol frames 100 on the data link layer level is to use what we may call Symmetric authentication and/or data security engines implemented as hardware blocks, also referred to as SADSE, as will be explained in more detail now turning to FIGS. 3A-3E.

Figure 3A:
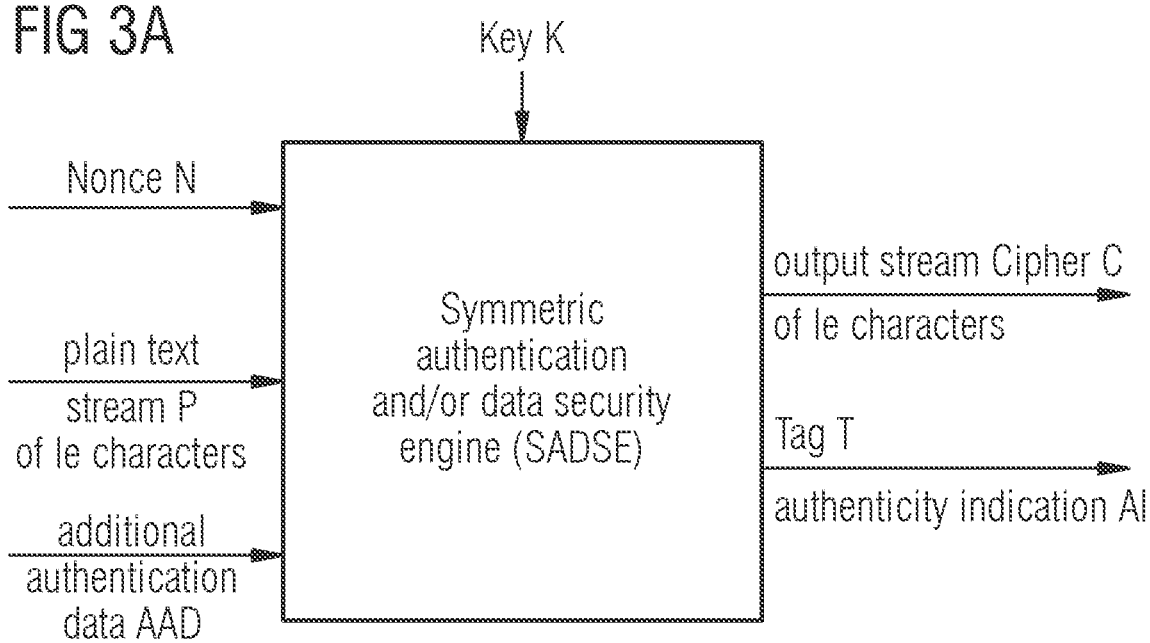
FIG. 3A shows a generic authentication and/or data security engine SADSE for protocol frames on data link layer level.

FIG. 3A shows input and output values for a SADSE. Naming of the input and output variables of the SADSE follows a naming convention established for block cipher modes in cryptography literature. One will appreciate that a SADSE may operate in an authenticity only AO mode or in an Authenticated Encryption mode AE. The SADSE accepts a secret key K, an optional nonce N, an input stream P of le characters length, and an additional authentication data AAD as input. The key K is conveniently a symmetric key of a certain length, say e.g. 128, 192 or 256 bits. As mentioned before key distribution is not in the focus of this disclosure. In fact, corresponding schemes are known, such as the MACsec Key Agreement defined in IEEE 802.1X-2010. The optional nonce N is typically an integer value that is used only once. One may, depending on circumstances decide to have an identical value for N for more than one protocol frame 100.

The input stream P has different uses, depending on the mode of operation of the SADSE. The additional authentication data AAD comprises some bits of further data used in the authentication, as will be explained further down.

The SADSE provides an output stream of le characters length, and may further output a tag T or alternatively directly an authentication indication AI. The output stream of length le has different use and meaning depending on the mode of operation of the SADSE.

The tag T is calculated based on the used input variables of the SADSE, and can be thought of as a recalculation of the security tag SecTag defined above. It may be convenient, depending on circumstances for the SADSE to directly output a result of comparing the security tag SecTag within the protocol frame 100 to the newly calculated tag T. This comparison result may be represented by the authenticity indication AI. This is to say, the authenticity information AI indicates, whether the protocol frame 100 was intended to be sent from the named sender S to the given receiver R (both typically mentioned in the header H). The authenticity indication AI further indicates, whether the protocol frame 100 is in its original form.

One may choose to use the optional sequence number SN as nonce N input to SADSE, as can be taken from FIG. 3A. This may include deriving the nonce N from the sequence number SN as explained before. Obviously, using the sequence number SN to derive a nonce N would simplify the efforts required for operating the SADSE as random generators increase complexity of a circuit implementing SADSE. For the sequence number SN to be useful as nonce N. It is of interest to estimate the required size for the sequence number SN. This is to answer the question: how long it will take until values for a given SN will be re-used as the counter implementing the sequence number SN starts counting from its start value again after reaching the counter's maximum value.

Let us consider a CAN XL frame (best seen in FIG. 4) in the in vehicle network, comprising—for the purpose of this estimation—of the maximum possible payload of 2048 Bytes and the minimum payload of 20 Bytes. We shall consider a counter length of 32, 37, 44 and 64 bits implementing the serial number SN which shall further serve as nonce N.

Such maximum payload frame would consist of 19 bits of header information, 16435 bit of payload and CRC information, and 26 bits of Acknowledge and EOF information. For a typical baud rate within the network, the full frame would take 1.7 ms to be communicated. A short frame with 20 Byte payload instead would be communicated faster.

In the following estimation let us consider three scenarios: A) using a counter SN to derive a nonce N for one single channel at the maximum possible traffic on this channel; B) consider the communication to be distributed over 512 channels in a round robin approach, and each channel has an individual sequence number SN from which the nonce N is derived, and C) using the counter SN as nonce N for one channel with only 30% of the maximum possible traffic. The result of this estimation can be taken from the table reproduced below.

It will be appreciated that a length of 32 bits is too short for some scenarios when implementing the serial number SN as counter. Obviously, scenarios A and C would not be sufficient considering the life time of a car.

Likewise, a bit length of 37 bits for the counter implementing the sequence number as nonce N is not sufficient for scenarios A and C, as 0.5 years for short frames in scenario A is too short given the life span of a car. The same holds for 1.5 years according to scenario C for short frames.

In contrast thereto a counter bit length of 44 bits or 64 bits appears sufficient for small frames and long frames for all three scenarios. In fact some of the time spans become so long that the actual value is not represented but only indicted by a dash.

TABLE

Use various bit lengths of Serial Number SN as Nonce

| Counter length in bits | Scenario | Small frame of 20 Bytes | Long frame of 2048 Bytes |
|---|---|---|---|
| 32 | A | 5 days | 86 days |
|  | B | 7 years | 120 years |
|  | C | 18 days | 1 year |
| 37 | A | 0.5 years | 7 years |
|  | B | 247 years | 3686 years |
|  | C | 1.5 years | 25 years |
| 44 | A | 62 years | 967 years |
|  | B | — | — |
|  | C | 206 years | 3223 years |
| 64 | A | 64987102 years | 1013997680 years |
|  | B | — | — |
|  | C | — | — |

Figure 3B:
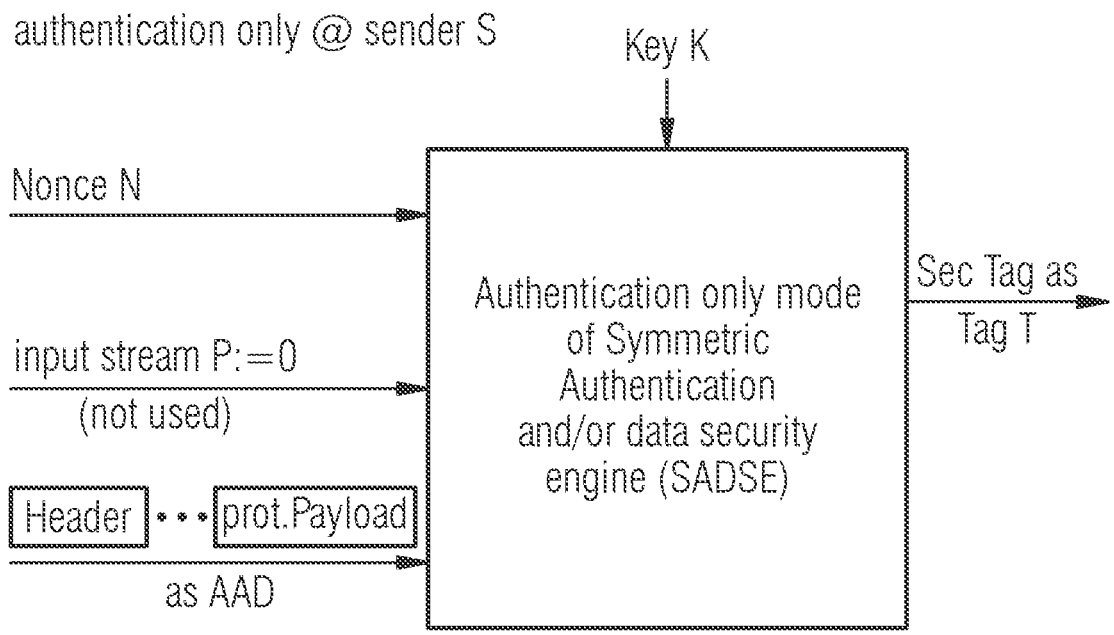
FIG. 3B shows input and output variables of a SADSE for authentication only at a sender on data link layer level.

Turning now to FIG. 3B, let us consider the SADSE in the authentication only mode AO at the sender S, this is to say when authenticating a protocol frame 100 according to FIG. 2A. In this mode, the input stream of length le is not used. The use of the key K is the same as before. SADSE further receives the sequence number SN and the additional authentication data AAD as input.

The additional authentication data AAD simply speaking comprises all information of the protocol frame 100 starting with the header H, up to and including the protected payload portion PP. If replay protection is not required, the protocol frame 100 may not comprise a sequence number SN, as discussed above in combination with FIG. 2B. As a consequence of SN not being set, the nonce N may be left at the previously used value or set to zero or any other convenient value. Obviously, the rule to set the nonce N has to be identical at the sender S and the receiver R.

It will be appreciated that the frame compiled by the sender S may comprise the generic indication, the first indication, and/or the security indication, as described before, in order to indicate a level of authentication for the frame 100 compiled by the sender S.

If only one generic key K is used as secret key within the bus-based communication system, the protocol frame 100 may not comprise the security info SecInf field as discussed with regards to FIG. 2B.

As already discussed with regards to FIG. 2B, in circumstances where no replay protection is needed and the generic key K is used in the bus-based communication system, the sequence number SN and the security info SecInf fields may be omitted. As explained above, the nonce N may be left at the previously used value, set to zero, or any other convenient value. Again, the rule to set the nonce N has to be identical at the sender S and the receiver R to authenticate and/or secure a given protocol frame 100.

In the authentication only mode AO at the sender S, the SADSE outputs a tag T calculated using the key K, the nonce N, and the additional authentication data AAD. The tag T may be integrated into the protocol frame 100 as the security tag SecTag, thereby generating an authenticated protocol frame 100.

Figure 3C:
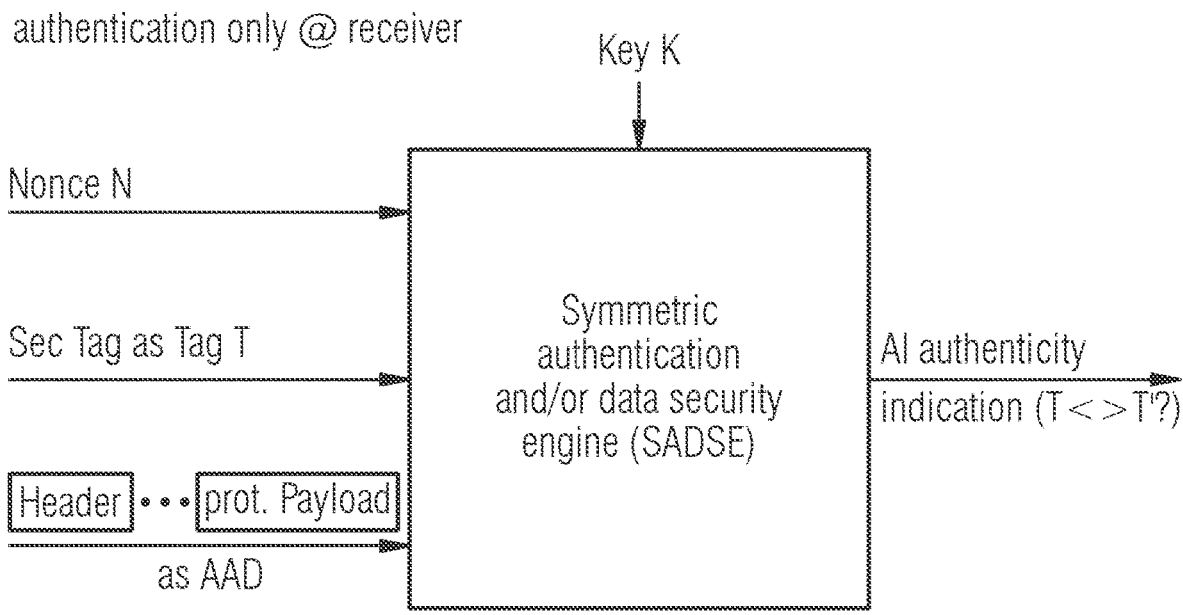
FIG. 3C shows input and output variables of a SADSE for authentication only at a receiver on data link layer level.

Turning now to FIG. 3C, let us consider the SADSE in the authentication only mode at the receiver R at data link layer level. The authentication only mode at the receiver R authenticates a protocol frame 100 received at the receiver R as an original protocol frame intended to be sent from the sender S to the receiver. In other words, the receiver R authenticates a protocol frame 100 according to FIG. 2A. In this mode, the security Tag is used as tag T taking the place of the input stream P in FIG. 3A. The use of the key K, and the sequence number SN is the same as before.

In the authentication only mode AO at the receiver, the additional authentication data AAD comprises all information of the protocol frame 100 starting with the header H, up to and including the protected payload portion PP. If replay protection is not required, the protocol frame 100 may not comprise a sequence number SN, as discussed above in combination with FIG. 2B. As a consequence of SN not being set, the nonce N may be left at the previously used value or set to zero or any other convenient value. Obviously, the rule to set the nonce N has to be identical at the sender S and the receiver R.

The receiver R is configured to extract an indication from the protocol frame. The indication may be implemented as the generic indication, the first indication, and/or the security indication, as described before, in order to indicate a level of authentication for the frame 100 received at the receiver R.

If only one generic key K is used as secret key within the bus-based communication system, the protocol frame 100 may not comprise the security info SecInf field as discussed with regards to FIG. 2B.

As already discussed with regards to FIG. 2B, in circumstances where no replay protection is needed and the generic key K is used in the bus-based communication system, the sequence number SN and the security info SecInf fields may be omitted. As explained above, the nonce N may be left at the previously used value, set to zero, or any other convenient value. Again, the rule to set the nonce N has to be identical at the sender S and the receiver R to authenticate and/or secure a given protocol frame 100.

In the authentication only mode AO at the receiver R, the SADSE outputs a tag T' calculated using the key K, the nonce N, and the additional authentication data AAD. The tag T' is a recalculation of the security tag SecTag generated at the sender S.

A comparison of the security tag SecTag within the protocol frame 100 as calculated at the sender S to the newly calculated tag T' at the receiver R, allows to authenticate whether the protocol frame 100 received at the receiver R was intended for transmission from the sender S to the receiver R, and further to authenticate whether or not the protocol frame 100 is in its original form.

It may be convenient for SADSE to directly output an authenticity indication AI, corresponding to the result of comparing the newly calculated tag T' to the security tag SecTag within the protocol frame 100. Given the security tag SecTag is input to the SADSE, all information for this comparison is available to the SADSE.

Let us consider an authenticated encryption mode of the SADSE, also referred to as AE mode.

Figure 3D:
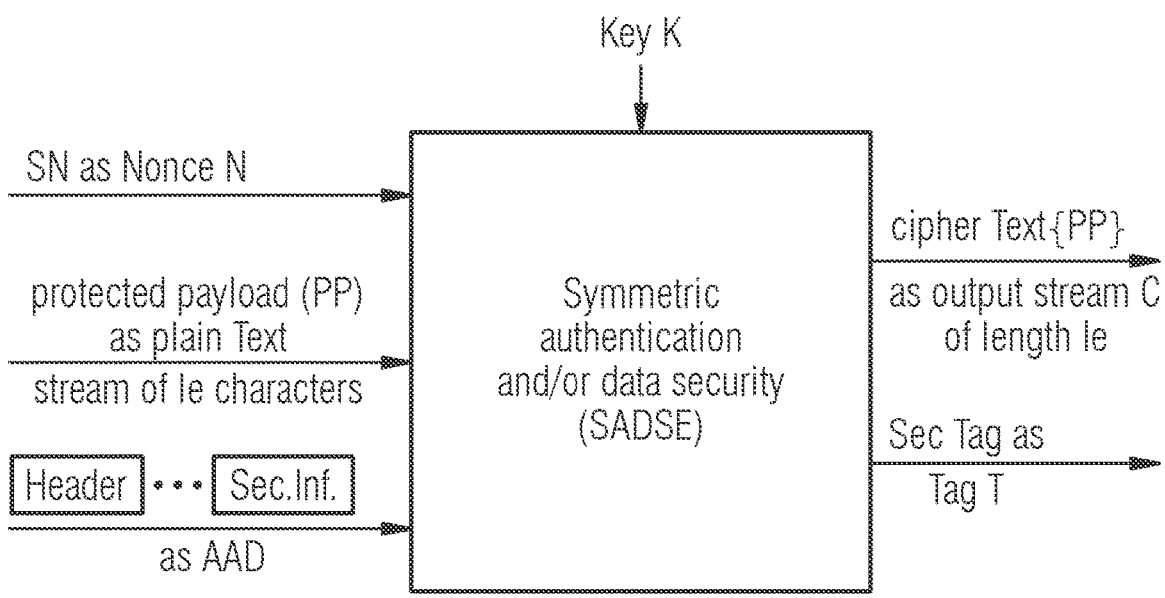
FIG. 3D shows input and output variables of a SADSE for authenticated encryption at a sender on data link layer level.

Turning now to FIG. 3D, an AE mode for the SADSE is described at the sender S. As before the SADSE receives the key K, and the sequence number SN as input. The protected payload portion PP takes the place of the input stream of length le. Note, that the protected payload portion PP is input as clear text.

In the AE mode at the sender S, the additional authentication data AAD comprise the header H, and the optional security information SecInf.

It will be appreciated that the frame compiled by the sender S may comprise the generic indication, the first indication, the second indication, and/or the security indication, as described before, in order to indicate a level of authentication and data protection for the frame 100 compiled by the sender S.

If replay protection is not required, the protocol frame 100 may not comprise a sequence number SN, as discussed above in combination with FIG. 2B. As a consequence of SN not being set, the nonce N may be left at the previously used value or set to zero or any other convenient value. Obviously, the rule to set the nonce N has to be identical at the sender S and the receiver R.

If only one generic key K is used as secret key within the bus-based communication system, the protocol frame 100 may not comprise the security info SecInf field as discussed with regards to FIG. 2B.

Again, in circumstances where no replay protection is needed and the generic key K is used in the bus-based communication system, the sequence number SN and the security info SecInf fields may be omitted. As explained above, the nonce N may be left at the previously used value, set to zero, or any other convenient value. Remember, the rule to set the nonce N has to be identical at the sender S and the receiver R to authenticate and/or secure a given protocol frame 100.

In the AE mode at the sender S, the SADSE outputs, as output stream C of length le, a cipher text cipher {protected payload PP} which is an encrypted version of the protected payload PP. The SADSE generates the cipher text cipher {protected payload PP} based on the nonce N, the protected payload PP, and the additional authentication data AAD In the AE mode at the sender S, the SADSE further outputs a security tag SecTag calculated using the key K, the nonce N, and the additional authentication data AAD. The security tag SecTag may be integrated into the protocol frame 100 leading to a protocol frame as discussed with regards to FIG. 2B. As explained above with regards to FIGS. 3B and 3C, the security tag SecTag may be used to authenticate the protocol frame 100 as intended to be sent from the sender S to the receiver, and further to authenticate, if the protocol frame 100 is in its original form.

Replacing the protected payload PP with the output cipher text cipher {PP} and adding the security tag SecTag to the protocol frame 100 at the sender S, leads to an authenticated and encrypted protocol frame as discussed with regards to FIG. 2C.

Figure 3E:
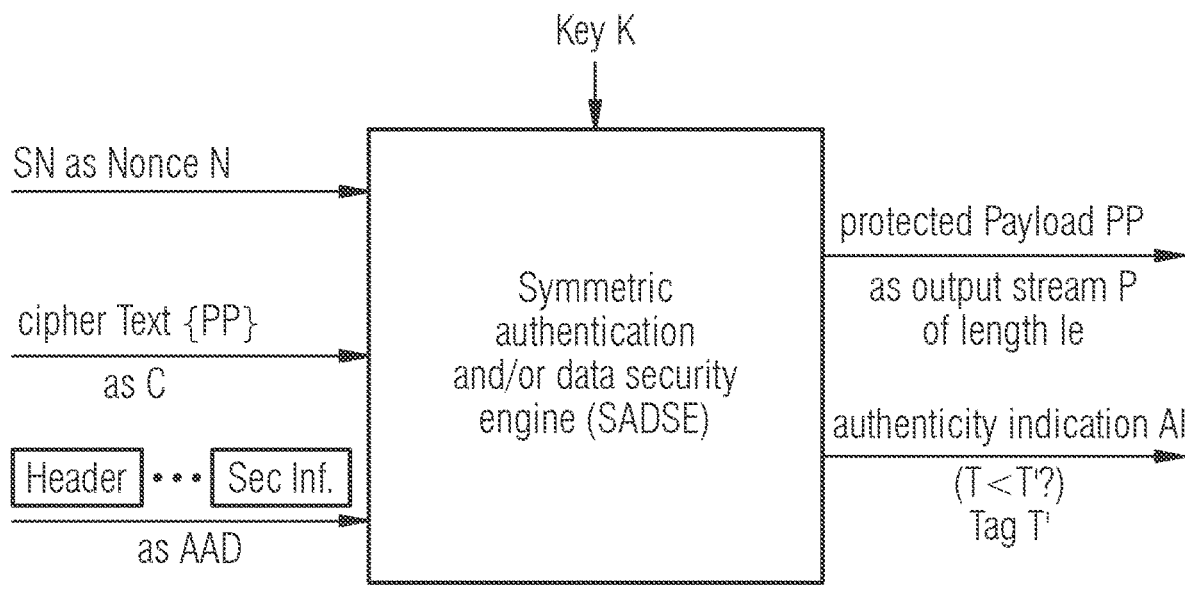
FIG. 3E shows input and output variables of a SADSE for decryption and authentication at a receiver on data link layer level.

Turning now to FIG. 3E an AE mode for the SADSE is described at the Receiver R. As before, the SADSE receives the key K, and the nonce N as input. In the AE mode of the receiver R, the cipher text of the protected payload portion cipher {PP} takes the place of the input stream of length le. Note, that the cipher text of the protected payload cipher {PP} is an encrypted version of the protected payload portion PP of identical length.

In the AE mode at the receiver R, the additional authentication data AAD comprises all information of the protocol frame 100 starting with the header H, up to but not including the protected payload portion PP. According to the protocol frame 100 discussed in FIG. 2B, the additional authentication data AAD may therefore comprise the header H, and the optional security information SecInf.

If replay protection is not required, the protocol frame 100 may not comprise a sequence number SN, as discussed above in combination with FIG. 2B. As a consequence of SN not being set, the nonce N may be left at the previously used value or set to zero or any other convenient value. Obviously, the rule to set the nonce N has to be identical at the sender S and the receiver R.

The receiver R is configured to extract an indication from the protocol frame. The indication may be implemented as the generic indication, the first indication, a payload type, and/or the security indication, as described before, in order to indicate a level of authentication and data protection for the frame 100 received at the sender S.

If only one generic key K is used as secret key within the bus-based communication system, the protocol frame 100 may not comprise the security info SecInf field as discussed with regards to FIG. 2B.

Again, in circumstances where no replay protection is needed and the generic key K is used in the bus-based communication system, the sequence number SN and the security info SecInf fields may be omitted. As explained above, the nonce N may be left at the previously used value, set to zero, or any other convenient value. Remember, the rule to set the nonce N has to be identical at the sender S and the receiver R to authenticate and/or secure a given protocol frame 100.

In the AE mode at the receiver R, the SADSE outputs, as output stream C of length le, the protected payload portion PP. The SADSE generates the decrypted version of the cipher text cipher{PP} based on the optional sequence number SN as nonce N, the cipher text cipher{PP}, and the additional authentication data AAD.

In the AE mode at the receiver R, the SADSE outputs a tag T' calculated using the key K, the optional sequence number as nonce N, and the additional authentication data AAD. The tag T' is a recalculation of the security tag SecTag generated at the sender S.

A comparison of the security tag SecTag within the protocol frame 100 as calculated at the sender S to the newly calculated tag T' at the receiver R, allows to authenticate whether the protocol frame 100 received at the receiver R was intended for transmission from the sender S to the receiver R, and further to authenticate whether or not the protocol frame 100 is in its original form.

It may be convenient for SADSE to directly output an authenticity indication AI, corresponding to the result of comparing the newly calculated tag T' to the security tag SecTag within the protocol frame 100. This would however require the security tag SecTag to be accessible to the SADSE (not shown in FIG. 3E).

One possible way to implement the SADSE according to the present disclosure would be a block cipher mode. A prominent example of such a block cipher mode is the AES Galois-Counter Mode.

For AES-GCM there exists a recommendation by NIST, the National institute for standards in the US, regarding respective bit lengths for input and output values of the AES-GCM. These parameters are summarized for authentication only mode AO in Table 1.

TABLE 1

Variables for SADSE implemented using AES-
GCM with symmetric cipher E using key K

| authentication only mode AO | Size in Bits |
|---|---|
| Key K | 128, 192, or 256 |
| Sequence number SN | 96 |
| Counter | — |
| Additional authentication Data AAD | 128*a |
| Plain text stream of le characters | — |
| Security Tag SecTag | 128 |
| Cipher Text cipher{PP} | — |

For the authentication only mode AO the plain text stream of le characters, is not used, as is the corresponding cipher text over the protected payload PP as plain text stream, which corresponds to the discussion of the AO mode of SADSE with regards to FIGS. 3B and 3C.

With regards to the additional authentication data AAD the length of 128*a bits is to indicate that an integer multiple a of 128 bits should be chosen to optimize performance of the AES-CGM mode implementing the SADSE of the present disclosure. Reaching a multiple of 128 bits may conveniently be achieved with zero padding. The counter CTR is an internal variable of the AES-GCM and reproduced for the sake of completeness, as not used in the AO mode.

Table 2 summarizes the respective bit length for input and output parameters of the AES-GCM implementing the SADSE.

TABLE 2

Variables for SADSE implemented using AES-
GCM with symmetric cipher E using key K

| authenticated encryption mode AE | Size in Bits |
|---|---|
| Key K | 128, 192, or 256 |
| Sequence number SN | 96 |
| Counter | 32 |
| Additional authentication Data AAD | 128*a |
| Plain text stream of le characters | 128*p |
| Security Tag SecTag | 128 |
| Cipher Text cipher{PP} | 128*p |

Different to the authentication only AO mode parameters in Table 1, the authenticated encryption mode AE makes use of the Counter, which is implemented as a 32 bit value.

Cipher Text cipher {PP} and the Additional authentication Data AAD should for optimal performance of the AES-GCM implementing the SADSE be a multiple of 128 bit long. To achieve such bit length zero padding is a convenient option.

Figure 4:
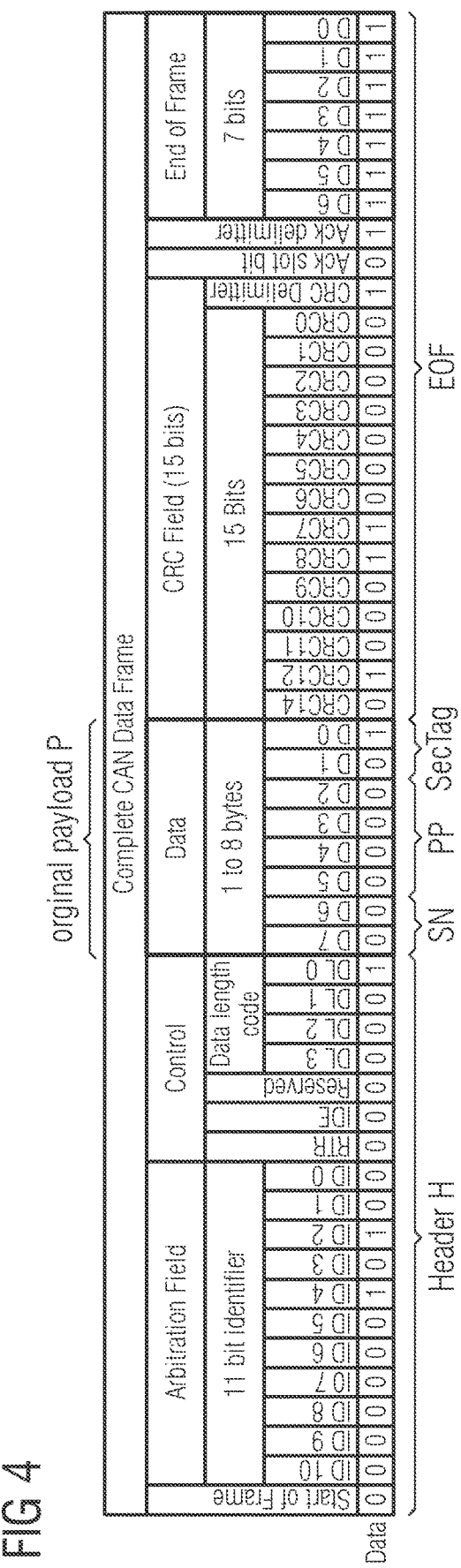
FIG. 4 illustrates a protocol frame according to the CAN standard.

FIG. 4 illustrates a protocol frame according to the CAN standard. The CAN frame starts with a Header H formed by and arbitration field of 11 bit, followed by a Control field of 7 bit. Both arbitration field and control are portions of the CAN frame of a bit length not commensurable to a full byte length, as was already discussed as an option for the protocol frames 100 of the present disclosure according to FIG. 2A-2d. Note, that the arbitration field may comprise of 29 bits according to CAN and CAN-FD standard, which are variants of the CAN standard as mentioned before.

The data field of 8 bytes corresponds to a payload P of an original protocol frame 100 according to FIG. 2A. A CRC field of 15 bits, together with an acknowledge slot bit, and an Acknowledge delimiter bit, as well as 7 bit of End of Frame correspond to the end of Frame portion EOF of the protocol frames discussed with respect to FIGS. 2A-2C.

If one wanted to adapt the SADSE concept implemented as AES-GCM cipher mode, in an AE mode, using one symmetric key K across the CAN network, one could use two bytes of the original payload P as a sequence number SN, and further two bytes as security tag SecTag, leaving a total of four bytes for the protected payload portion PP.

It may be convenient to set the sequence number SN as the first two bytes of the original payload P, as an incorrect sequence number would be detected earlier than in cases where the two sequence number bytes are shifted further downstream the original payload portion P.

Likewise moving the security tag SecTag toward the end of the protected payload PP will prevent the protected payload portion to be segmented by the security tag SecTag, which would render parsing of the CAN frame more complicated. As an alternative the SecTag and the sequence number SN could both be shifted to the beginning of the protected payload portion PP.

With such an approach, protection against replay attacks is achieved, while maintaining 50% of the original payload capacity P.

For a key size of 128 bits for the AES-GCM mode with one generic key K within the CAN System, and a sequence number SN of two bytes, Table 3 summarizes input and output parameter lengths for the authentication only mode AO, for inclusion of the security tag SecTag and the sequence number SN in the CAN frame.

TABLE 3

Variables for SADSE implemented using
AES-GCM applied to CAN frame

| authentication only mode AO for CAN | Size in Bits |
|---|---|
| Key K | 128, 192, or 256 |
| Sequence number SN | 16 |
| Counter | — |
| Additional authentication Data AAD | 50 |
| Plain text stream of le characters | — |
| Security Tag SecTag | 128 |
| Cipher Text cipher{PP} | — |

In the example of FIG. 4, the sequence number has a size of 2 bytes, which corresponds to 16 bits. The key length of key K is 128 bits. The additional authentication data comprises of the Header, having a total length of 18 bits, and 4 bytes protected payload PP, which corresponds to 32 bits, leading in total to 50 bit as indicated in Table 3. To achieve efficient computation of the AES-GCM consider zero-padding for the remaining 78 bits needed to reach a total length of 128 bit for the AAD.

It will be appreciated that the length values stated in Table 3 would change further, if one was to omit the sequence number SN, in order to increase the available bytes for the protected payload PP to 6 bytes. This additional protected payload bits obviously come at the expense of no protection against replay attacks. Obviously one could decide, depending on security requirements, to shorten the security tag SecTag to a size below two bytes in order to increase the available bytes for the protected payload portion PP in return.

For a key size of 128 bits for the AES-GCM mode with one generic key K within the CAN System using a sequence number SN, Table 4 summarizes input and output parameter lengths for the AE mode.

TABLE 4

Variables for SADSE implemented using AES-GCM with one key K across the CAN bus

| authenticated encryption mode AE | Size in Bits |
| --- | --- |
| Key K | 128, 192, or 256 |
| Sequence number SN | 16 |
| Counter | 112 (not required in CAN frame) |
| Additional authentication Data AAD | 18 |
| Plain text stream of le characters | 32 |
| Security Tag SecTag | 16 |
| Cipher Text cipher{PP} | 32 |

The additional authentication data AAD in the AE mode comprises of the Header, having a total length of 18 bits. To achieve efficient computation of the AES-GCM consider zero-padding for the remaining bits needed to reach a total block size of 64 bits for the AAD.

It will be appreciated that the length values stated in Table 4 would change further, if one was to omit the sequence number SN, in order to increase the available bytes for the protected payload PP to 6 bytes. This additional protected payload bits obviously come at the expense of no protection against replay attacks. Obviously one could decide, depending on security requirements, to shorten the security tag SecTag to a size below two bytes in order to increase the available bytes for the protected payload portion PP in return.

It is one variant when implementing the SADSE functionality for the CAN bus communication system to consider block ciphers of shorter block size than the AES-CGM. Simon Speck is one example of such lightweight ciphers defined by the National Security Agency in the US. Table 5 summarizes various block and key sizes for the Simon and Speck block cipher family.

TABLE 5 summarizes block sizes and respective available key sizes for theSimon and Speck cipher

| Block size in bits | Key sizes in bits |
| --- | --- |
| 32 | 64 |
| 48 | 72, 96 |
| 64 | 96, 128 |
| 96 | 96, 144 |
| 128 | 128, 192, 256 |

Let us consider a key size of 64 bits for the Simon and Speck block cipher with one generic key K within the CAN System with a header size of 18 bits, a sequence number SN, and the security Tag SecTag of two bytes, each.

Table 6 summarizes input and output parameter lengths for the authentication only AO mode with inclusion of the security tag SecTag and the sequence number SN in the CAN frame.

As we can see from Table 6, the plain text stream and the Cipher Text will be of 32 bits length, which corresponds to exact one block size. Therefore, no zero-padding is required for those fields as with the AES-GCM, and operation of the Simon Speck is more efficient for a CAN frame than the AES-CGM.

TABLE 6

Variables for SADSE implemented using Simon and Speck with one key K of 64 bits across the CAN bus

| authentication only mode AO | Size in Bits |
| --- | --- |
| Key K | 64 |
| Sequence number SN | 16 |
| Counter | 16 (not required in CAN frame) |
| Additional authentication Data AAD | 50 |
| Plain text stream of le characters | — |
| Security Tag SecTag | 16 (shortened form 32 bits) |
| Cipher Text cipher{PP} | — |

It will be apparent to a person skilled in the art, that a shortening or an omission of the sequence number SN and/or the security tag SecTag may increase the protected payload portion PP, reducing as a tradeoff the level of protection for the CAN frame.

The additional authentication data is 50 byte long as was the case for the AES-GCM as discussed above and will require zero padding as this length is between one and two block sizes of the Simon and Speck block size of 32 bits.

Table 7 summarizes input and output parameter lengths for the authenticated encryption mode with inclusion of the security tag SecTag and the sequence number SN in the CAN frame.

TABLE 7

Variables for SADSE implemented using Simon and Speck with one key K of 64 bits across the CAN bus

| authenticated encryption mode AE | Size in Bits |
| --- | --- |
| Key K | 64 |
| Sequence number SN | 16 |
| Counter | 16 (not required in CAN frame) |
| Additional authentication Data AAD | 18 |
| Plain text stream of le characters | 32 |
| Security Tag SecTag | 16 (shortened form 32 bits) |
| Cipher Text cipher{PP} | 32 |

As we can see from Table 7, the plain text stream and the Cipher Text will be of 32 bits length, which corresponds to exact one block size. Therefore, no zero-padding is required for those fields as with the AES-GCM, and operation of the Simon Speck is more efficient for a CAN frame than the AES-CGM in this respect. However, the additional authentication data AAD is shorter than a full block size and hence requires zero padding, as was the case for the AES-CGM discussed in the example above.

The above described example implementations are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the implementations herein.

What is claimed is:

1. A protocol frame for communication between participants of a bus-based communication system in a vehicle according to a protocol, the protocol frame comprising:
   a header, indicating a start of the protocol frame to be communicated between a sender and a receiver, both the sender and the receiver being participants of the bus-based communication system, and
   an indication, the indication configured to indicate a level of authenticity or a level of data security of the protocol frame on a data link layer level based on the protocol frame being only authenticated, or being authenticated and encrypted.

2. The protocol frame according to claim 1, wherein the indication comprises a first indication configured to indicate authentication on the data link layer level for the protocol frame.

3. The protocol frame according to claim 2, wherein the indication comprises a second indication configured to indicate authentication and data security, both on the data link layer level for the protocol frame.

4. The protocol frame according to claim 3, wherein at least one of the indication, the first indication, or the second indication is at least one of:
part of the header of the protocol frame,
represented as a payload type of the protocol frame,
represented as a security indication flag, or
represented as a bit field within the header.

5. The protocol frame according to claim 1, further comprising:
security information downstream from the header; and
a protected payload portion downstream from the header, wherein the security information indicates a protection level for the protected payload portion.

6. The protocol frame according to claim 5, wherein the security information is further configured to indicate at least one of:
a virtual channel between the sender and the receiver, or
one or more keys.

7. The protocol frame according to claim 5, wherein the security information is further configured to indicate a security association indicating a key to be selected for authentication or authentication and data security for the protocol frame on the data link layer level.

8. The protocol frame according to claim 1, wherein the protocol frame further comprises:
a security tag configured to verify authenticity of the protocol frame on the data link layer level as original protocol frame intended for transmission from a sender to a receiver; and
wherein the security tag is configured to verify the authenticity of the protocol frame at the sender on the data link layer level or flat the receiver on the data link layer level.

9. The protocol frame according to claim 1, wherein the protocol frame has a length N as used with a controller area network (CAN) standard, a CAN flexible data-rate standard, or a CAN extra-large standard.

10. The protocol frame according to claim 1, wherein the protocol frame selectively has a length N of eight bytes, eight to 64 bytes, or 64 to 2048 bytes.

11. A sender on a data link layer level configured to participate in a bus-based communication system in a vehicle, the sender configured to:
generate a header in response to a request from a higher protocol layer;
access a key K of k bytes length;
receive from the higher protocol layer a protected payload portion;
aggregate additional authentication data;
generate a security tag using the key K and the additional authentication data, the security tag to verify an authenticity of a frame as an original frame sent from the sender to a receiver on the data link layer level; and
generate a protocol frame comprising the header, the protected payload portion, the additional authentication data, and an indication,
wherein the sender is configured to communicate the protocol frame from the sender to one or more participants of the bus-based communication system on the data link layer level, and
wherein the indication is configured to indicate a level of authenticity or a level of data security of the protocol frame based on the protocol frame being only authenticated, or authenticated and encrypted.

12. The sender according to claim 11, wherein the bus-based communication system is a broadcast based bus system such that all nodes within the bus-based communication system are configured to receive the protocol frame communicated by the sender.

13. The sender according to claim 11, wherein the indication comprises a first indication configured to indicate authentication on the data link layer level for the protocol frame, or a second indication configured to indicate authentication and data security, both on the data link layer level for the protocol frame.

14. The sender according to claim 11, wherein in an authentication only mode of the sender, the additional authentication data is:
the header, and
the protected payload portion.

15. The sender according to claim 11, wherein the sender in an authenticated encryption mode is further configured to:
generate a cipher text for the protected payload portion using:
the key,
the protected payload portion in plain text, and
the header, as additional authentication data.

16. The sender according to claim 11, wherein the sender is further configured to:
generate a sequence number of sn bytes length downstream from the header; and
integrate the sequence number into the protocol frame at an expense of a shortened protected payload, the shortened protected payload being shortened by the sn bytes length compared to the protected payload portion.

17. The sender according to claim 11, wherein the sender is configured to:
generate security information of length si, using the key K; and
integrate the security information into the protocol frame downstream from the header at an expense of a shortened payload, the shortened payload being shortened by si bytes compared to the protected payload portion, wherein the security information indicates a protection level for the protected payload portion.

18. The sender according to claim 11, wherein the sender in an authenticated encryption mode is further configured to:
generate security information of si bytes length; and
integrate the security information into the protocol frame downstream from the header to an expense of a shortened protected payload, the shortened protected payload being shortened by a sum of the si bytes length and sn bytes length compared to the protected payload portion, wherein the security information indicates a protection level for the shortened protected payload.

19. The protocol frame of claim 1, further comprising:
a generic indication within the header indicating that the level of authenticity or the level of data security is present for the protocol frame,
wherein the header is associated with the data link layer level.

20. The sender according to claim 11, wherein the protocol frame comprises a generic indication within the header indicating that the level of authenticity or the level of data security is present for the protocol frame,
   wherein the header is associated with the data link layer level.

\* \* \* \* \*

UNITED STATES PATENT AND TRADEMARK OFFICE
CERTIFICATE OF CORRECTION

PATENT NO. : 11,321,442 B2
APPLICATION NO. : 16/825896
DATED : May 3, 2022
INVENTOR(S) : Alexander Zeh et al.

Page 1 of 1

It is certified that error appears in the above-identified patent and that said Letters Patent is hereby corrected as shown below:

In the Claims

Claim 8:
Column 23, Line 43, change "or flat the receiver" to --or at the receiver--

Signed and Sealed this
Twelfth Day of July, 2022

*Katherine Kelly Vidal*

Katherine Kelly Vidal
*Director of the United States Patent and Trademark Office*